United States Patent
Drake

(10) Patent No.: US 9,393,714 B2
(45) Date of Patent: Jul. 19, 2016

(54) CONSTRUCTION TIMBER

(75) Inventor: Frederick Spencer Drake, Tzaneen (ZA)

(73) Assignee: SPENCER DRAKE TRUST (IT 8663/95), Tzaneen (ZA)

(*) Notice: Subject to any disclaimer, the term of this patent is extended or adjusted under 35 U.S.C. 154(b) by 158 days.

(21) Appl. No.: 14/342,124

(22) PCT Filed: Aug. 29, 2012

(86) PCT No.: PCT/ZA2012/000055
§ 371 (c)(1),
(2), (4) Date: May 27, 2014

(87) PCT Pub. No.: WO2013/033736
PCT Pub. Date: Mar. 7, 2013

(65) Prior Publication Data
US 2014/0322475 A1    Oct. 30, 2014

(30) Foreign Application Priority Data

Sep. 2, 2011 (ZA) ................. 2011/06440

(51) Int. Cl.
| | |
|---|---|
| *B27F 1/16* | (2006.01) |
| *B27M 1/08* | (2006.01) |
| *B27M 3/00* | (2006.01) |
| *B27B 1/00* | (2006.01) |
| *B32B 38/00* | (2006.01) |

(52) U.S. Cl.
CPC ............. *B27M 1/08* (2013.01); *B27B 1/002* (2013.01); *B27F 1/16* (2013.01); *B27M 3/002* (2013.01); *B27M 3/0086* (2013.01); *B32B 38/0004* (2013.01); *Y10T 156/1079* (2015.01); *Y10T 428/192* (2015.01)

(58) Field of Classification Search
CPC .................... B27F 1/16; B27B 1/002
See application file for complete search history.

(56) References Cited

U.S. PATENT DOCUMENTS

| | | |
|---|---|---|
| 5,351,731 A | 10/1994 | Brandt et al. |
| 2010/0075095 A1 | 3/2010 | Johnson et al. |
| 2011/0179740 A1* | 7/2011 | Padmanabhan .... B62D 25/2054 52/588.1 |

FOREIGN PATENT DOCUMENTS

| | | |
|---|---|---|
| EP | 0 650 811 A1 | 5/1995 |
| EP | 2 072 593 A1 | 6/2009 |
| FR | 2 756 206 A1 | 5/1998 |

OTHER PUBLICATIONS

International Search Report for Application No. PCT/ZA2012/000055 dated Jan. 28, 2013, 5 pages.

(Continued)

*Primary Examiner* — Alexander Thomas
(74) *Attorney, Agent, or Firm* — Howard & Howard Attorneys PLLC

(57) ABSTRACT

The invention provides a method for method for producing construction timber planks, construction timber and laminated planks or beams. The method includes the steps of sawing debarked and plantation dried logs from *Eucalyptus* trees having a moisture content of 18% or higher into planks having lengths suitable for the next step as described below. The planks are cross cut into lengths of about 0.5 m to 2.5 m and their end edges are profiled for finger jointing. The end edges of a series of profiled planks are joined by longitudinally pressing end edges together using a polyurethane glue to lengths required for construction timber planks.

8 Claims, 1 Drawing Sheet

(56) References Cited

OTHER PUBLICATIONS

English language abstract and machine-assisted English translation for EP 0 650 811 extracted from espacenet.com database on Jun. 5, 2015, 17 pages.

English language abstract and machine-assisted English translation for FR 2 756 206 extracted from espacenet.com database on Jun. 5, 2015, 16 pages.

Crafford, Philippus Lodewicus, "An Investigation of Selected Mechanical and Physical Properties of Young, Unseasoned and Finger-Jointed Eucalyptus Grandis Timber", Department of Forest and Wood Science, Mar. 2013, pp. 1-87.

Malan, Francois S., "Eucalyptus Improvement for Lumber Production", IPEF, IPT, IUFRO and ESALQ (eds) Anais do Seminario Internacional de Utilizacao da Madeira de Eucalipto pra Serraria, Sao Paulo, Brazil, Division of Forest Science and Technology, 1995, pp. 1-19.

Department of Agriculture, Forestry and Fisheries, Forestry Branch, "Report on Commercial Timber Resources and Primary Roundwood Processing in South Africa", 2007/2008, 137 pages.

SA Forestry Magazine, "Sawmilling and Processing", downloaded from http://www.saforestrymag.co.za/articles/detail/using_moist_eucalyptus_for_structural_timber on Jan. 28, 2016, 3 pages.

Sabie, "Forestry", downloaded from http://www.sabie.co.za/about/forestry/ on Jan. 28, 2016, 6 pages.

Travan, L., "Eucalyptus Drying Process: Qualitative Comparision of Different Clones Cultivated in Italy", The Future of Quality Control for Wood & Wood Products, 4-7th, Edinburgh, The Final Conference of Cost Action E53, May 2010, 14 pages.

\* cited by examiner

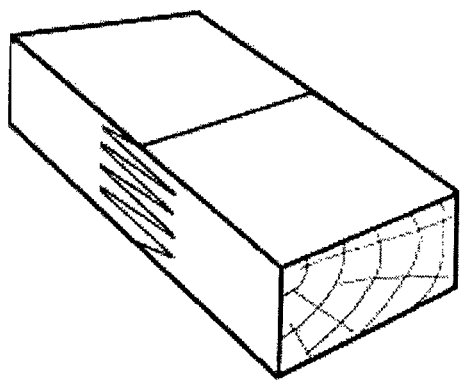

CONSTRUCTION TIMBER

RELATED APPLICATIONS

This application is the National Stage of International Patent Application No. PCT/ZA2012/000055, filed on Aug. 29, 2012, which claims priority to and all the advantages of South African Patent Application No. ZA 2011/06440, filed on Sep. 2, 2011, the content of which is incorporated herein by reference.

TECHNICAL FIELD OF THE INVENTION

This invention relates to a method of making construction and structural timber specifically from wet *Eucalyptus* hardwoods.

BACKGROUND TO THE INVENTION

The inventor is aware of the use of softwoods such as pine for the manufacturing of construction timber. However, the costs for the pine logs and the drying process are relatively expensive.

It is well known that affordable hardwoods such as *Eucalyptus* are unsuitable for construction timber due to the high longitudinal and tangential tension of this wood causing splitting, cupping, twisting, bowing and warping in normal lengths required for construction timber. Another limitation is that when *Eucalyptus* is dry, the timber becomes hard limiting nail penetration severely.

It is an object of the invention to provide alternative, user friendly, durable and more affordable construction timber.

GENERAL DESCRIPTION OF THE INVENTION

According to the invention there is provided a method for producing construction timber planks, which method includes, but not limited to, the steps of:

sawing debarked and plantation dried logs from *Eucalyptus* trees having a moisture content of 18% or higher into planks having lengths suitable for the next step as described below;

cross cutting the planks into lengths of about 0.5 m to 2.5 m;

profiling end edges of the cross cut planks for finger jointing; and jointing opposed end edges of a series of profiled planks by longitudinally pressing end edges together using a polyurethane glue to lengths required for construction timber planks.

The method may include the step of felling, debarking and drying in the plantation of the debarked timber for about 6 weeks to reach a moisture content of between 40 and 18% preferably about 30%. It will be appreciated that the slow drying process is not expensive and releases a substantial portion of the tension. It will be appreciated that plantation drying can be effected at a location other than the plantation however, the costs of transporting freshly felled trees is more than transportation of partially dried wood.

It will further be appreciated that the shorter cross cut lengths of the planks releases substantial longitudinal and tangential stress and the method may include the steps of profiling and classing the longer cut planks for cutting into appropriate shorter lengths ranging from about 0.5 m to about 2.4 m.

The glue may preferably be a moisture curing adhesive. It may further preferably be a 100% solids and waterproof adhesive, such as Purbond™ from Purbond AG Switzerland.

The preferred *Eucalyptus* species is selected from *saligna* and *grandis*, although other *Eucalyptus* varieties can also be used if so desired.

The end edge joined long planks are then planed on all four sides to standard dimensions.

It will be appreciated that the method, in accordance with the invention, avoids the expensive and high energy consuming step of kiln drying. Obviously, kiln drying can still be used should it be required to reach appropriate moisture content.

The invention also extends to construction timber such as roof trusses, which is manufactured by the method described above, which timber includes:

two or more lengths of plantation dried planks of lengths of about 0.5 m to 2.5 m of *Eucalyptus* finger jointed together along opposed end edges thereof with a polyurethane glue as described above to produce a longer plank useful for construction.

The construction timber may also be used to manufacture laminated planks or beams, which includes three or more face joined construction timber planks using the same glue. The abutting planks may preferably have generally opposing grain structures to balance stresses.

BRIEF DESCRIPTION OF THE DRAWING

FIG. 1 shows a perspective view of a joined portion of finger jointed planks.

DETAILED DESCRIPTION OF THE INVENTION

The invention is now described by way of example with reference to the accompanying drawing FIG. 1, which shows a perspective view of a joined portion of finger jointed planks.

The first step of the method, in accordance with the invention will start in a *Eucalyptus saligna* planation, for example. A selected row of trees will be felled and left to dry in the plantation for about 6 weeks to reach a moisture content of above 18%, preferably about 30%. If needed, the felled trees can be further kiln dried in log form or plank form.

The debarked and plantation dried logs are then cut to length and transported to a saw mill to be cut into planks for the next step in the saw mill. The planks are then assessed in terms of the grain and longitudinal stress of each plank to determine the most suitable lengths for cross cutting. The next step is cross cutting the planks into lengths of about 0.5 m to 2.5 m. The end edges of the cross cut planks are then profiled into complementary configured fingers for finger jointing. Opposed end edges of a series of profiled planks is then wetted with Purbond™ glue and finger joined by longitudinally pressing complementary profiled end edges together and allowed to cure or set. The numbers of planks so joined are selected to provide lengths required for construction timber planks. The edge joined long planks are then planed on all four sides to standard dimensions and cross cut to standard lengths.

It shall be understood that the example is provided for illustrating the invention further and to assist a person skilled in the art with understanding the invention and is not meant to be construed as unduly limiting the reasonable scope of the invention.

The inventor believes that the invention provides a structurally sound and lower cost alternative for construction timber by avoiding the need to kiln dry and by using a lower cost timber.

The invention claimed is:

1. A method for producing construction timber planks, which method comprises the steps of:

sawing debarked and plantation dried logs from *Eucalyptus* trees having a moisture content of 18% or higher into planks having lengths suitable for the next step as described below;

cross cutting the planks into lengths of about 0.5 m to 2.5 m;

profiling end edges of the cross cut planks for finger jointing; and jointing opposed end edges of a series of profiled planks by longitudinally pressing end edges together using a polyurethane glue to lengths required for construction timber planks.

2. A method for producing construction timber planks as claimed in claim 1, which further comprises the step of felling, debarking and drying in the plantation of the debarked timber for about 6 weeks to reach a moisture content of between 40 and 18%.

3. A method for producing construction timber planks as claimed in claim 2, wherein the moisture content is 30%.

4. A method for producing construction timber planks as claimed in claim 2, which further comprises the steps of profiling and classing the planks for cross cutting into appropriate shorter lengths ranging from 0.5 m to 2.4 m.

5. A method for producing construction timber planks as claimed in claim 1, which further comprises the steps of profiling and classing the planks for cross cutting into appropriate shorter lengths ranging from 0.5 m to 2.4 m.

6. A method for producing construction timber planks as claimed in claim 1, wherein the glue is selected from a moisture curing adhesive.

7. A method for producing construction timber planks as claimed in claim 1, wherein the *Eucalyptus* species is selected from *saligna* and *grandis*.

8. A method for producing construction timber planks as claimed in claim 1, which further comprises the step of planing all four sides of edge joined planks.

\* \* \* \* \*